UNITED STATES PATENT OFFICE.

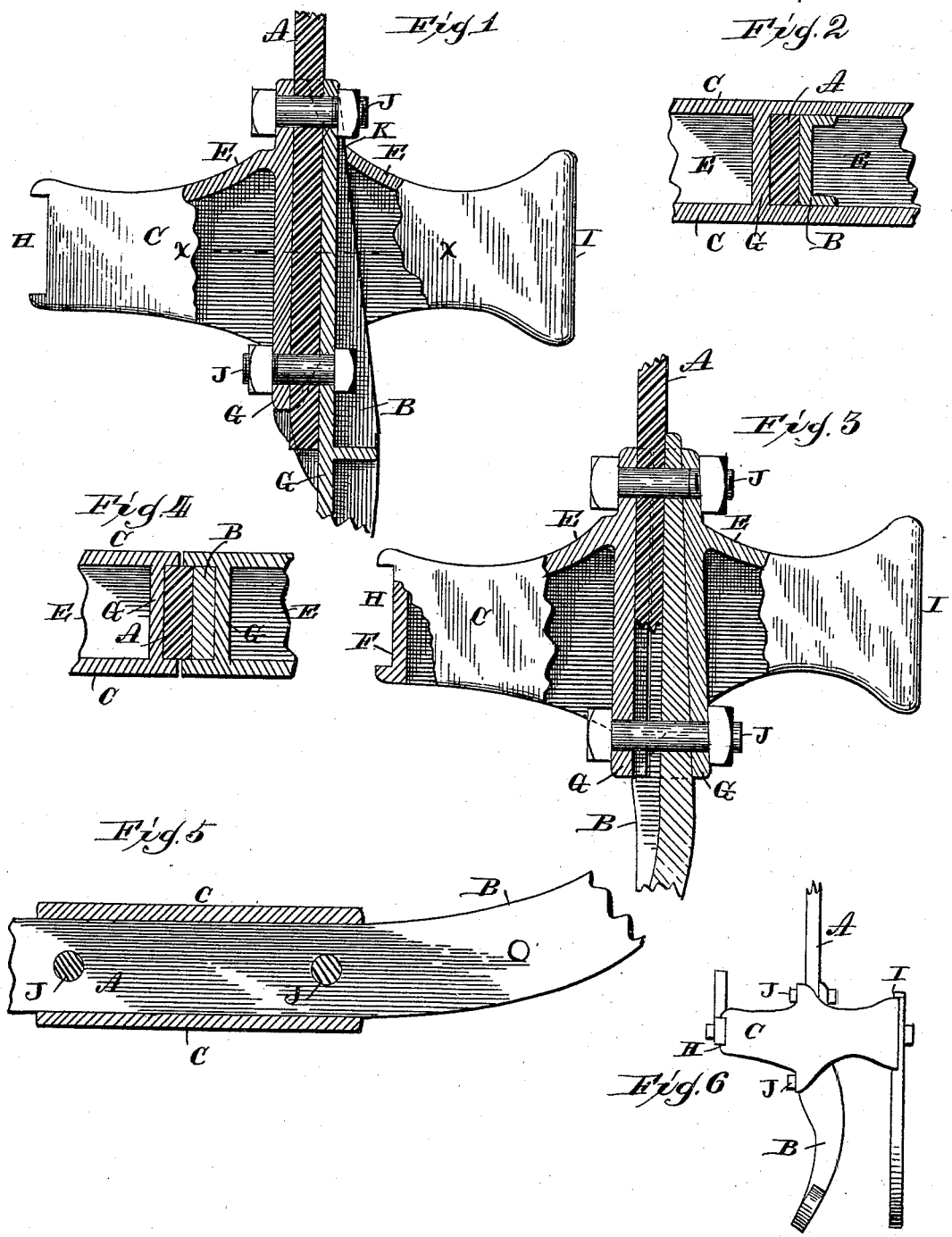

PHINEAS P. MAST, OF SPRINGFIELD, OHIO, ASSIGNOR TO THE P. P. MAST & COMPANY, OF SAME PLACE.

CROSS-HEAD FOR CULTIVATORS.

SPECIFICATION forming part of Letters Patent No. 416,173, dated December 3, 1889.

Application filed February 1, 1889. Serial No. 298,400. (No model.)

*To all whom it may concern:*

Be it known that I, PHINEAS P. MAST, a citizen of the United States, residing at Springfield, in the county of Clark and State of Ohio, have invented certain new and useful Improvements in Cross-Heads for Cultivators, of which the following is a specification, reference being had therein to the accompanying drawings.

This invention relates to certain new and useful improvements in cultivators, and has reference to a cross-head for rigidly connecting the shovel-standards with the beam, both with and without adaptability for securing or supporting the handle or handle-bracket when made in a separate piece from the beam, and by which the beam is manipulated, and also has reference to the manner of constructing the said cross-head, whether it be constituted of one or more than one piece of material, as will hereinafter be more fully pointed out.

In the accompanying drawings, forming a part of this specification, and on which like reference-letters indicate corresponding parts, Figure 1 represents a partial plan and partial sectional view of the cross-head, a portion of the beam, and the handle-bracket; Fig. 2, a vertical sectional view on the line x x of Fig. 1; Fig. 3, a similar view to Fig. 1, with the cross-head constructed of two pieces; Fig. 4, a similar view to Fig. 2, being a cross-section through Fig. 3; Fig. 5, a partial side elevation and sectional view of the rear end of the beam fashioned to constitute a handle-bracket and of the cross-head; and Fig. 6, a plan view, on a small scale, of the cross-head, handle-bracket, the standards, and a portion of the beam.

The letter A designates the rear portion of a cultivator-beam of any approved type, but preferably of the type which consists of a stout rectangular bar, the forward end of the beam being coupled to the arch in any of the known or approved ways.

The letter B refers to the handle-bracket, or that part of the handle which is connected with the beam, or which forms a part of the beam, the said part in either case being connected with the cross-head. It curves to one side and curves upwardly in the rear of the cross-head, so as to afford the proper disposition to the handle, and is provided with holes to receive the connecting-bolts. In Fig. 5 the beam itself is extended to the rear of the cross-head and fashioned to constitute the handle-bracket in lieu of the separate handle-bracket.

The cross-head consists of a stout skeleton bar composed of upper and lower walls C and of rear walls E, of end walls F, and of one or more intermediate walls G, according to whether it is constructed of one or more pieces. A vertical shovel-standard seat H is formed in one end, and a similar horizontal seat I in the other end, in which the upper ends of the shovel-standards are fitted and fastened by bolts, as seen in Fig. 6. The wall or walls G of the cross-head have holes for the passage of the bolts J, by which the beam and the handle-bracket are secured, or by which the beam alone is secured in the form shown in Fig. 5. An opening K is formed in the wall E when the cross-head is composed of one piece, and through this opening is projected the beam and the beam-bracket, or the beam alone in the form shown in Fig. 5, and the bolts J pass through the beam and beam-bracket, or the beam alone, as the case may be, and clamp the parts strongly and firmly together.

Referring to Figs. 3 and 4, it will be observed that the cross-head is constructed in two pieces, which constitute a duplicate of so much of the cross-head as lies at either side of the beam in the form shown in Figs. 1 and 2, with the exception of the additional wall shown in Figs. 3 and 4. The bolts J pass through both the walls G in this latter form, instead of through a single wall G in the other form, and the two sections are thus strongly connected to each other, with the beam and handle-bracket or the beam, as the case may be, intervening.

I prefer that the standard-seats in the cross-heads shall be opposite to each other; but it is obvious that one may be placed in advance of the other, or that they may be otherwise out of line. I also prefer to make the cross-heads horizontal on their upper and lower sides; but it is perfectly obvious that this may be changed without departing from my invention.

I claim to be the inventor of and regard as new a cross-head rigidly secured to a cultivator-beam and having provision for the connection of one or more shovel-standards, and to accommodate or not a handle-bracket, additionally to the beam, as distinguished from a cross-head pivotally connected with the beam, as in the type of cultivators known as "parallel-beam" cultivators.

Having thus fully described my invention, what I claim as new, and desire to secure by Letters Patent, is—

1. The combination, with a cross-head constructed in skeleton form and having a transverse vertical wall intermediate its ends, and a vertical opening in the body of the head adjacent to said wall, and upper and lower body-walls, of a beam and handle-bracket fitted into the head and held against the said wall by suitable fastening devices.

2. A cross-head for a cultivator-beam fashioned to carry one or more shovel-standards, and provided with a transverse wall intermediate its length and upper and lower body-walls, and having a space between said latter walls adapted to receive the cultivator-beam and to form a rigid connection therewith.

3. The combination, with a cultivator-beam having its rear end fashioned to constitute a handle-bracket, of a cross-head having a transverse opening therethrough, into which said beam is snugly fitted, and fastening devices to secure the beam and head rigidly together.

4. The combination, with a cross-head adapted to carry one or more shovel-standards and having an opening therein, of a beam projected into the head and fitted snugly to the opening, and suitable fastening devices which secure the head and beam together.

5. The combination, with a beam, of a cross-head composed of two sections fashioned to embrace the beam, and fastening devices which rigidly secure the beam and said sections together.

In testimony whereof I affix my signature in presence of two witnesses.

PHINEAS P. MAST.

Witnesses:
C. C. KIRKPATRICK,
H. S. FOLGER.